(12) United States Patent
Smeltzer

(10) Patent No.: US 11,151,642 B2
(45) Date of Patent: Oct. 19, 2021

(54) METHOD AND SYSTEM OF ELECTRONIC BARTERING

(71) Applicant: Michael Christian Smeltzer, Brooklyn, NY (US)

(72) Inventor: Michael Christian Smeltzer, Brooklyn, NY (US)

(*) Notice: Subject to any disclaimer, the term of this patent is extended or adjusted under 35 U.S.C. 154(b) by 0 days.

(21) Appl. No.: 16/732,319

(22) Filed: Jan. 1, 2020

(65) Prior Publication Data

US 2020/0211096 A1 Jul. 2, 2020

Related U.S. Application Data

(60) Provisional application No. 62/787,662, filed on Jan. 2, 2019.

(51) Int. Cl.
*G06Q 30/06* (2012.01)
*G06Q 40/04* (2012.01)

(52) U.S. Cl.
CPC ..... *G06Q 30/0643* (2013.01); *G06Q 30/0619* (2013.01); *G06Q 40/04* (2013.01)

(58) Field of Classification Search
CPC . G06Q 30/0641; G06Q 30/0619; G06Q 40/04
USPC .............................................. 705/27.1, 26.44
See application file for complete search history.

(56) References Cited

U.S. PATENT DOCUMENTS

| 2008/0103986 A1* | 5/2008 | Bocheck | G06Q 30/06 705/80 |
| 2014/0195379 A1* | 7/2014 | Hay | G06Q 30/0619 705/26.44 |
| 2015/0073942 A1* | 3/2015 | Narasimhan | G06Q 30/0639 705/26.62 |
| 2015/0294399 A1* | 10/2015 | Spaulding | G06Q 30/0641 705/27.1 |
| 2019/0259499 A1* | 8/2019 | Hong | G16H 50/20 |
| 2020/0044856 A1* | 2/2020 | Lynde | H04L 9/0618 |

FOREIGN PATENT DOCUMENTS

| WO | WO-0111518 A2 * | 2/2001 | G06Q 30/06 |
| WO | WO-2004102350 A2 * | 11/2004 | G06Q 40/00 |

OTHER PUBLICATIONS

"ExchangeAnything.com Debuts Online Barter, Exchange and Donation Technology for Business and Consumer Community, Portal Sites ExchangeAnything.com debuts online barter, exchange and donation technology for business and consumer community, portal sites" (Apr. 4, 2000). Business Wire Retrieved from Dialog on Feb. 1, 2021.*

* cited by examiner

*Primary Examiner* — Yogesh C Garg
(74) *Attorney, Agent, or Firm* — Christopher Mayle; Bold IP, PLLC

(57) ABSTRACT

A system and method for electronic bartering where users capture an image of a tradeable item, search for other tradeable items, and make a bartering offer to another user whereby the bartering transaction is recorded. The barter transactions are analyzed for consumer habits and trends information where users may be presented information calculated from the analyzed barter transactions to determine the barter value and market value of their tradeable items and how to make best estimates when to barter their tradeable items and how to improve their bartering efficiency.

19 Claims, 12 Drawing Sheets

METHOD AND SYSTEM OF ELECTRONIC BARTERING

CROSS-REFERENCE TO RELATED APPLICATIONS

This application is a non-provisional application which claims priority to U.S. Provisional Application No. 62/787,662 filed on Jan. 2, 2019, which is incorporated by reference in its entirety.

FIELD OF THE DISCLOSURE

This disclosure relates generally to the field of electronic bartering systems which provide data over a computer network and in particular to a real time system and method of electronic bartering and recording bartering transactions on a distributed computer network.

BACKGROUND

Even with modern technology and advancements with data storage and the internet, it remains relatively difficult to barter goods and services without the use of fiat currency. Further, not only is if difficult to barter goods and services, it is difficult to identify potential goods a barterer may be willing to trade as they often are kept in private storage. Typically, to initiate a barter transaction, a barterer must know what items a person has before an offer is made, and the barterer must have sufficient knowledge of the value of the goods and services in order to make an offer for goods or services of equal or near equal value. The internet has made making barter transaction easier, allowing users to easily connect and make bartering transactions. However, these transactions are still very time extensive and costly as users must research the value of items if they desire the transactions to be fair to both parties. Further, many bartering websites do not take into account the net value of items or seasonal demand of items and other consumer trends. Therefore, users of electronic bartering systems must work with limited data sets to perform their own timely research on bartering transactions without transaction history of similar goods that have been bartered.

Thus, a way to quickly perform electronic bartering transactions and have access to electronic bartering data is needed. The disclosed system and method is directed to overcoming one or more of the problems set forth above.

SUMMARY

The disclosure presented herein relates to an electronic bartering system comprising, one or more databases coupled via a network, one or more processors coupled to the one or more databases, and at least one computing device coupled to the one or more processors and the one or more databases via the network, wherein the one or more processors are configured for: receiving a first image of a first item from a first user on a first computing device, wherein the first image is stored in the one or more databases and associated with image information data and profile data of the first user, classifying the first image and the image information data to a first tradeable item wherein the first tradeable item is presented on the second computing device as available for a bartering transaction, receiving a second image of a second item from a second user on a second computing device, wherein the second image is stored in the one or more databases and associated with image information data and profile data of the second user, classifying the second image and the image information data to a second tradeable item wherein the second tradeable item is presented on the second computing device as available for a bartering transaction, displaying on the first computing device a selectable input graphical user interface, the selectable input graphical user interface having images of tradeable items available for a bartering transaction, receiving from the first computing device, request data for a request to receive the second tradeable item in exchange for the first tradeable item and storing the request data in the one or more databases, transmitting the request to the second computing device as an offer for a bartering transaction, receiving from the second computing device, acceptance data for the request to receive the first tradable item in exchange for the second tradeable item and storing the acceptance data in the one or more databases, recording the barter transaction for the exchange of the first tradeable item and the second tradeable item, updating the association of the profile data in the one or more databases associated with the first image and image information from the first user to the second user, updating the association of the profile data in the one or more databases associated with the second image and image information from the second user to the first user, collecting real time market value data for determining a market value for the first tradeable item and the second tradeable item, the market value data collected from one or more online marketplaces, determining the market value of the first tradeable item by retrieving the current price of the first tradeable item from the one or more online marketplaces, determining the market value of the second tradeable item by retrieving the current price of the second tradeable item from the one or more online marketplaces, determining a barter value for the first tradeable item by the combined determined market value of tradeable items that have been exchanged for first tradeable item over a predetermined time period, presenting through the user interface, the barter value and the market value of the first tradeable item, the barter value of the first tradeable item presented to a subset of users with profile data associated with the first tradeable item, calculating a barter score, the barter score calculated form subtracting the market value of the first tradeable item from the market value of the second tradeable item exchanged for the first tradeable item, calculating the total barter value of the tradeable items of the first user, the total barter value calculated from the sum of the barter value of the tradeable items associated with the profile data of the first user, calculating the total market value of the tradeable items of the first user, the total market value calculated from the sum of the market value of the tradeable items associated with the profile data of the first user, presenting through the user interface, the total barter value and the total market value of the tradeable items associated with the profile data of the first user, storing a history of the total barter value associated with the profile data of the first user, presenting the history of total barter value associated with the profile data of the first user, storing a history of the barter transactions associated with the profile data of the first user, presenting the history of the barter transactions associated with the profile data of the first user, comparing the barter transaction of the first tradeable item in exchange for the second tradeable item to a list including multiple barter transactions, each of said multiple barter transactions including an exchange of the same first tradeable item in the barter transaction for another tradeable item, scoring the barter transaction from the comparison to the other barter transactions, the score determined by the market value or barter value of the another tradeable item exchanged for the first tradeable item, displaying the score of the barter transaction and one or more ranking indicator, the one or more ranking indicator displayed based on the percentile of the score of the barter transaction in comparison to all of the scores of the multiple barter transactions, adjusting the barter value, the market value, and the ranking for the barter transaction based on the quality of the first tradeable item and the second tradeable item, presenting shipping options through the selectable input graphical user interface on the first computing device, the shipping options including a shipping service and a shipping insurance for receiving the second tradeable item, performing a financial transaction for the shipping options selected between the first user receiving the second tradeable item and a delivery agent, subtract, a value from the financial transaction for a referral fee, initiating a bidding process to determine which one of a plurality of bidding eligible delivery agents will deliver the second tradeable item to the first user, connecting the first user to one of the plurality of delivery agents based on the outcome of the bidding process, presenting shipping options through the selectable input graphical user interface on the first computing device, wherein the user interface displays the location of the second tradeable items being delivered to the first user by the one of the plurality of delivery agents overlaid on a virtual map corresponding to their real world location along with the one or more interactive markers, receiving a goal, the goal selected by the first user for a desired performance barter score, the performance barter score calculated from the sum or average of one or more barter transactions for tradeable items associated with the profile data of the first user over a predetermined time period, presenting an indicator in response to the performance barter score reaching the desired performance barter score, presenting an indicator in response to the performance barter score not reaching the desired barter score, the indicator facilitating how performance barter score can reach desired performance barter score, transmitting a counter offer to the first computing device from the second computing device for a third tradeable item associated with the profile data of the first user in exchange for the second tradeable item, receiving from the first computing device, acceptance data for the request to receive the second tradable item in exchange for the third item and storing the acceptance data in the one or more databases, recording the barter transaction for the exchange of the third tradeable item and the second tradeable item, updating the association of the profile data in the one or more databases associated with a third image and image information of the another from the first user to the second user, and updating the association of the profile data in the one or more databases associated with the second image and image information from the second user to the first user.

The present disclosure presented also relates to a computer implemented method for implementing an electronic bartering system, the method comprising: receiving a first image of a first item from a first user, wherein the first image is stored in the one or more databases and associated with image information data and profile data of the first user, the first image stored by one or more computing devices that include one or more programs containing instructions associated with the electronic bartering system, classifying the first image and the image information data to a first tradeable item wherein the first tradeable item is presented to a second user as available for a bartering transaction, receiving a second image of a second item from a second user, wherein the second image is stored in the one or more databases and associated with image information data and profile data of the second user, the second image stored by the one or more computing devices, classifying the second image and the image information data to a second tradeable item wherein the second tradeable item is presented as available for a bartering transaction, displaying a selectable input graphical user interface, the selectable input graphical user interface having images of tradeable items available for a bartering transaction wherein the images of tradeable items available are filterable by user or tradeable item, receiving request data for a request to receive the second tradeable item in exchange for the first tradeable item and storing the request data in the one or more databases, transmitting the request to the second user as an offer for a bartering transaction, receiving acceptance data for the request to receive the first tradable item in exchange for the second tradeable item and storing the acceptance data in the one or more databases, recording the barter transaction for the exchange of the first tradeable item and the second tradeable item, updating the association of the profile data in the one or more databases associated with the first image and image information from the first user to the second user, updating the association of the profile data in the one or more databases associated with the second image and image information from the second user to the first user, collecting real time market value data for determining a market value for the first tradeable item and the second tradeable item, the market value data collected from one or more online marketplaces, determining the market value of the first tradeable item by retrieving the current price of the first tradeable item from the one or more online marketplaces, determining the market value of the second tradeable item by retrieving the current price of the second tradeable item from the one or more online marketplaces, determining a barter value for the first tradeable item by the combined determined market value of tradeable items that have been exchanged for first tradeable item over a predetermined time period, calculating a barter score, the barter score calculated form subtracting the market value of the first tradeable item from the market value of the second tradeable item exchanged for the first tradeable item, presenting through the user interface, the barter value, the market value, and the barter score of the first tradeable item, the barter value of the first tradeable item presented to a subset of users with profile data associated with the first tradeable item, calculating the total barter value of the tradeable items of the first user, the total barter value calculated from the sum of the barter value of the tradeable items associated with the profile data of the first user, calculating the total market value of the tradeable items of the first user, the total market value calculated from the sum of the market value of the tradeable items associated with the profile data of the first user, and presenting through the user interface, the total barter value and the total market value of the tradeable items associated with the profile data of the first user.

The preceding and following embodiments and descriptions are for illustrative purposes only and are not intended to limit the scope of this disclosure. Other aspects and advantages of this disclosure will become apparent from the following detailed description.

DEFINITIONS

Memory refers to a computer memory, which is any physical device capable of storing information temporally or permanently. For example, Random Access memory (RAM), is a volatile memory that stores information on an integrated circuit used by the operating system, software, and hardware.

A server is a computer that provides data to other computers. It may serve data to systems on a local area network (LAN) or a wide area network (WAN) over the Internet.

A local area network may serve as few as two or three users (for example, in a small-office network) or several hundred users in a larger office. LAN networking comprises cables, switches, routers and other components that let users connect to internal servers, websites and other LANs via wide area networks.

A wide area network (WAN) is a geographically distributed private telecommunications network that interconnects multiple local area networks (LANs).

Wi-Fi is the standard wireless local area network (WLAN) technology for connecting computers and myriad of electronic devices to each other and to the Internet. Wi-Fi is the wireless version of a wired Ethernet network, and it is commonly deployed alongside ethernet.

A database (DB) is an electronic filing system, generally in a computer. A collection of information (usually as a group of linked data files) organized in such a way that a program can quickly select pieces of data.

A computer network ("network") is a group of computer systems and other computing hardware devices that are linked together through communication channels to facilitate communication and resource-sharing among a wide range of users A computing device is any electronic equipment controlled by a CPU (Central processing Unit), including desktop and laptop computers, smartphones and tablets. It usually refers to a general-purpose device that can accept software for many purposes in contrast with a dedicated unit of equipment such as a network switch or router.

A distributed computer network is the network system over which computer programming, software, and its data are spread out across more than one computer, but communicate complex messages through their nodes (computers), and are dependent upon each other.

A distributed ledger is a database that is consensually shared and synchronized across network spread across multiple sites, institutions or geographies. It allows transactions to have public "witnesses," thereby making a cyberattack more difficult. The participant at each node of the network can access the recordings shared across that network and can own an identical copy of it. Further, any changes or additions made to the ledger are reflected and copied to all participants in a matter of seconds or minutes. Underlying the distributed ledger technology is the blockchain, which is the technology that underlies bitcoin and other cryptocurrencies.

A blockchain is a digital, public ledger that records online transactions. Blockchain is the core technology for cryptocurrencies like bitcoin. A blockchain ensures the integrity of a cryptocurrency by encrypting, validating, and permanently recording transactions. A blockchain is similar to a bank's ledger, but open and accessible to everyone who utilizes the cryptocurrency is supports.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
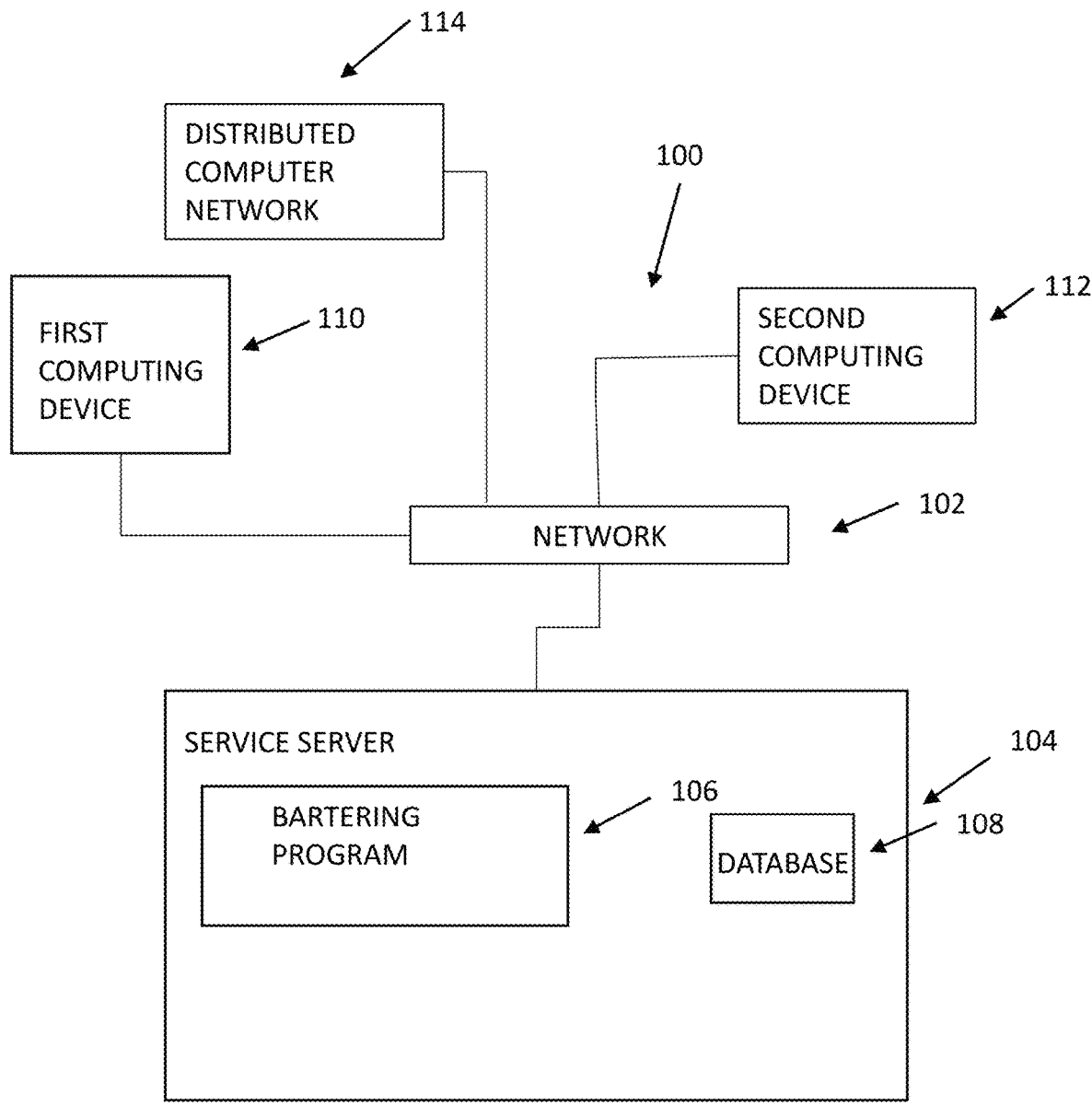
FIG. 1 depicts a block diagram depicting a computing environment, in accordance with an embodiment of the present invention.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

Embodiments of the present invention are related to electronic bartering systems and methods. The process of electronic bartering involves a myriad of tasks including but not limited capturing an image of an item on a computing device, storing the item image and item data on a service server, selecting a tradeable item and making a bartering offer to another user on a different computing device and recording the bartering transaction on a distributed computer network. Further, the tasks can include analyzing the recorded barter transactions on the distributed computer network for consumer habits and trends information and, in one or more embodiments, displaying this information to a user on a computing device.

Typically, electronic bartering is conducted in a manner utilizing telephones, facsimile, email, and dedicated computer programs that are installed and operated on a computer. These conventional methods, however, tend to be redundant, time consuming, error-prone, and overall inefficient due to users having to research the market value of the goods or services they wish to trade, as well as not having access to sufficient transactional data or consumer habits and trends information. What is needed is an online method and system for connecting bartering parties and providing a central location to communicate. In addition, the current electronic bartering method and process of connecting barterers and providing market information may be difficult as current databases are often inaccessible because they are private and data can be corrupted and manipulated by individuals.

One object of the present invention is to provide centralized administration of electronic bartering that is globally accessible by users. The advantage of this object is a decrease in paper handling, redundancy, collection of consumer habits and trends information, cost, inaccuracy, and general efficiency compared with more conventional modes of bartering and electronic bartering.

To meet these and other objects and advantages of the present invention, preferred and alternate embodiments of an online method and system for electronic bartering are provided. The present invention will now be described in detail with reference to the Figures.

FIG. 1 depicts a block diagram of a computing environment 100 in accordance with one or more embodiments of the present invention. FIG. 1 provides an illustration of one or more embodiments and does not imply any limitations regarding the environment in which different embodiments may be implemented. In the depicted embodiment, computing environment 100 includes a network 102, a service server 104, a bartering program 106, a database 108, a first computing device 110, a second computing device 112 and a distributed computer network 114. As depicted, computing environment 100 provides an environment for bartering program 106 and database 108 to access content created on computing device 110 through network 102. Computing environment 100 may include additional servers, computers, or other devices not shown.

Computing environment 100 may also include one or more administrative entities communicating over network 102 in one or more non-limiting embodiments, which may be distributed over network 102 in any number of physical locations. Administrative entities may manipulate the software and enter commands to server 104 using any number of input devices such as keyboard and mouse. The input/output may be viewed on a display screen to the one or more administrative entities.

Network 102 may be a network that may support communications between service server 104 and computing device 110 in accordance with embodiments of the invention. In one or more non-limiting embodiments, network 102 may include a local area network (LAN), such as a company Intranet, a metropolitan area network (MAN), or a wide area network (WAN), such as the Internet or World Wide Web. Network 102 may be a private network, a public network, or a combination thereof. Network 102 may be any type of network known in the art, including a telecommunications network, a wireless network (including Wi-Fi), and a wireline network. Network 102 may include mobile telephone networks utilizing any protocol or protocols used to communicate among mobile digital computing devices (e.g. computing device 110), such as GSM, GPRS, UMTS, AMPS, TDMA, or CDMA. In one or more non-limiting embodiments, different types of data may be transmitted via network 102 via different protocols. In further non-limiting embodiments, computing devices 110 and 112 may act as standalone devices or they may operate as peer machines in a peer-to-peer (or distributed) network environment.

Network 102 may further include a system of terminals, gateways, and routers. Network 102 may employ one or more cellular access technologies including 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if, for instance, they are in a remote location not accessible by other networks.

Service server 104 may be a management server, a web server, or any other electronic device or computing system capable of processing program instructions and receiving and sending data. Server 104 may comprise components, subsystems, and modules to support one or more management services for computing environment 100. Server 104 may comprise computing systems similar to content provider computing devices 110 and 112. In some embodiments, service server 104 may be a laptop computer, tablet computer, netbook computer, personal computer (PC), a desktop computer, or any programmable electronic device capable of communicating with the computing devices 110, 112 via network 102. Server 104 may be located at a data center or any other location suitable for providing service to network 102 whereby server 104 may be in one central location or in many different locations in multiple arrangements. Server 104 may comprise a database server such as MySQL® or Maria DB® server. Server 104 may have an attached data storage system storing software applications and data. Server 104 may receive requests and coordinate fulfillment of those requests through other servers.

In other embodiments, service server 104 may represent a server computing system utilizing multiple computers as a server system, such as in a cloud computing environment. In another embodiment, server 104 represents a computing system utilizing clustered computers and components to act as a single pool of seamless resources. In some embodiments, the creator of the content may provide all the potential options on service server 104.

Server 104 may comprise a number of modules that provide various functions. Modules may be in the form of software or computer programs that interact with the operating system of server 104 whereby data collected in databases may be processed by one or more processors within server 104 or another component of computing devices 110 and 112 as well as in conjunction with execution of one or more other computer programs. Software instructions for implementing the detailed functionality of the modules may be written in or natively understand C, C++, Visual Basic, Java, Python, Tcl, Perl, Scheme, Ruby, etc. Modules may be configured to receive commands or requests from components of computing environment 100. In the depicted embodiment, service server 104 includes bartering program 106 and database 108. In other embodiments, service server 104 may include any combination of bartering program 106 and database 108.

Bartering program 106 operates to provide a system and method of electronic bartering. Bartering program 106 captures an image of an item on a computing device, stores the item image and item data on the service server, displays tradeable items on the computing device, transmits barter, and records the bartering transaction on a distributed computer network. Further, bartering program 106 can analyze the recorded bartering transactions on the distributed computer network for consumer habits trends and, in one or more embodiments, display this information to a user on a computing device. In the depicted embodiment, bartering program 106 resides on service server 104 with database 108 and utilizes network 102 for the computing devices 110, 112 to access the content. In some embodiments, bartering program 106 resides on the first computing device 110 or the second computing device 112. In other embodiments, bartering program 106 may be located on another server or computing device, provided bartering program 106 has access to database 108 and the computing devices 110, 112.

Database 108 may be a repository that may be written to and/or read by bartering program 106. Information gathered from bartering program 106 may be stored to database 108 as well as any analyze techniques, metadata, and additional data that bartering program 106 may use to analyze, extract, create, and associate tags in content. In one or more embodiments, database 108 is a database management system (DBMS) used to allow the definition, creation, querying, update, and administration of one or more database. In the depicted embodiment, database 108 resides on service server 104. In other embodiments, database 108 resides on another server, or another computing device, as long as database 108 is accessible to bartering program 106.

The first computing device 110 and the second computing device 112 may be a management server, a web server, or any other electronic device or computing system capable of processing program instructions and receiving and sending data. In some embodiments, the computing devices 110, 112 may be a mobile phone, mobile device, laptop computer, tablet computer, netbook computer, personal computer (PC), a desktop computer, or any programmable electronic device capable of communicating with service server 104 via network 102. In other embodiments, the computing devices 110, 112 may represent a server computing system utilizing multiple computers as a server system, such as in a cloud computing environment. In another embodiment, the computing devices 110, 112 represents a computing system utilizing clustered computers and components to act as a single pool of seamless resources. In the depicted embodiment, the computing devices 110, 112 communicates with bartering program 106 via network 102. In other embodiments, computing device 110 may include any combination of bartering program 106 and database 108.

The distributed computer network 114 may be a network system over which the program 106 may store barter transactional data over more than one computer. In one or more embodiments, the distributed computer network 114 may be spread across multiple sites, institutions or geographies. In one or more embodiments, the distributed computer network 114 may be a distributed ledger database that is consensually shared and synchronized across the distributed computer network 114. In a further embodiment, underlying the distributed ledger database is the blockchain.

In one or more embodiments, the program 106 utilizes deep machine learning and artificial intelligence in one or more of the steps below, allowing exceptional results, improved speed and accuracy, and continual improvement.

Figure 2:
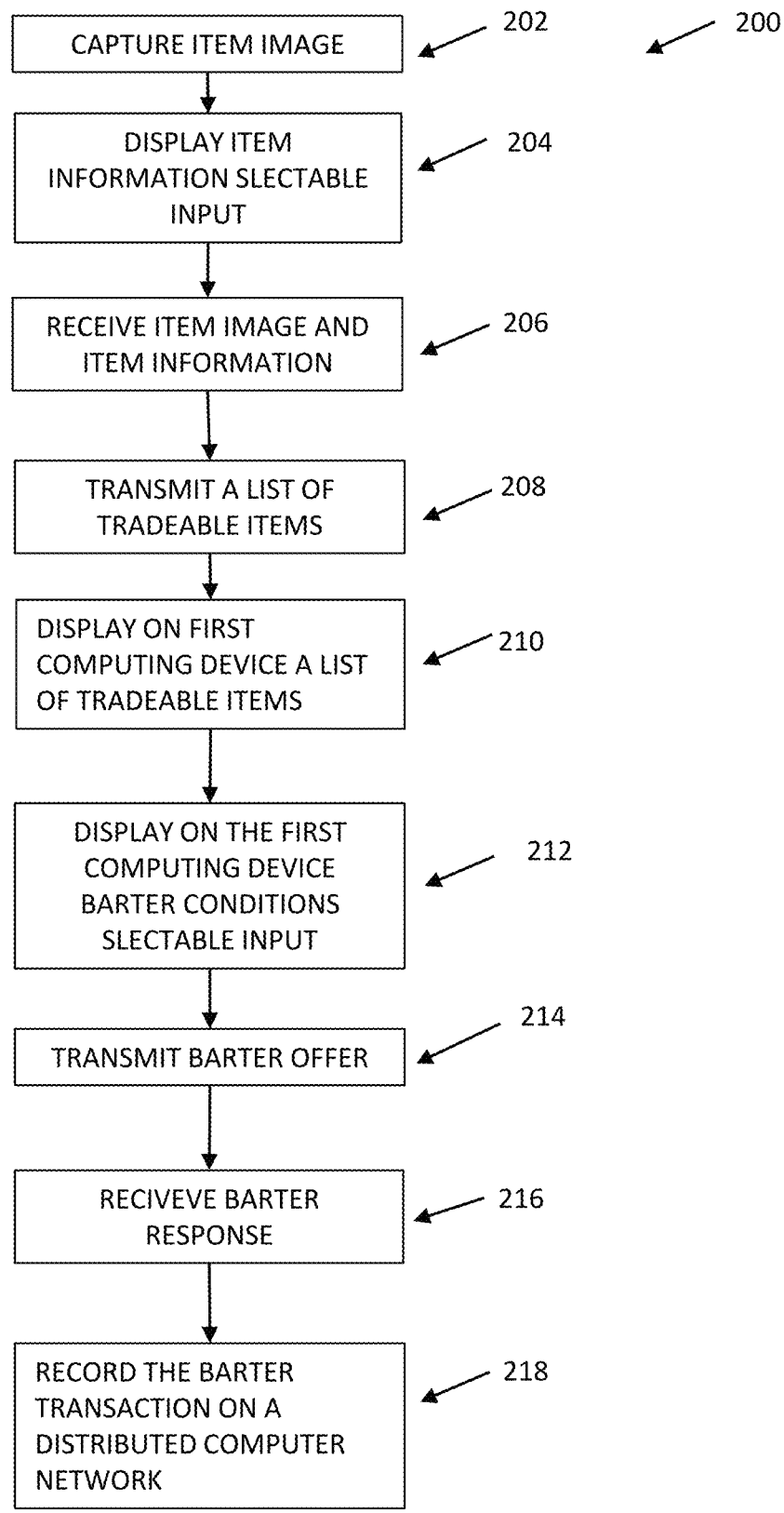
FIG. 2 depicts a flowchart of the operational steps taken by bartering program within computing environment of FIG. 1, in accordance with an embodiment of the present invention.

FIG. 2 depicts a flowchart of the operational steps taken by the bartering program 106 to capture an image of an item on a computing device, store the item image and item data on the service server, display tradeable items on the computing device, transmit barter and records the bartering transaction on a distributed computer network, within computing environment 100 of FIG. 1, in accordance with an embodiment of the present invention. FIG. 2 provides an illustration of one or more embodiments and does not imply any limitations regarding computing environment 100 in which different embodiments may be implemented. Modifications to the depicted flowchart may be made.

Figure 3:
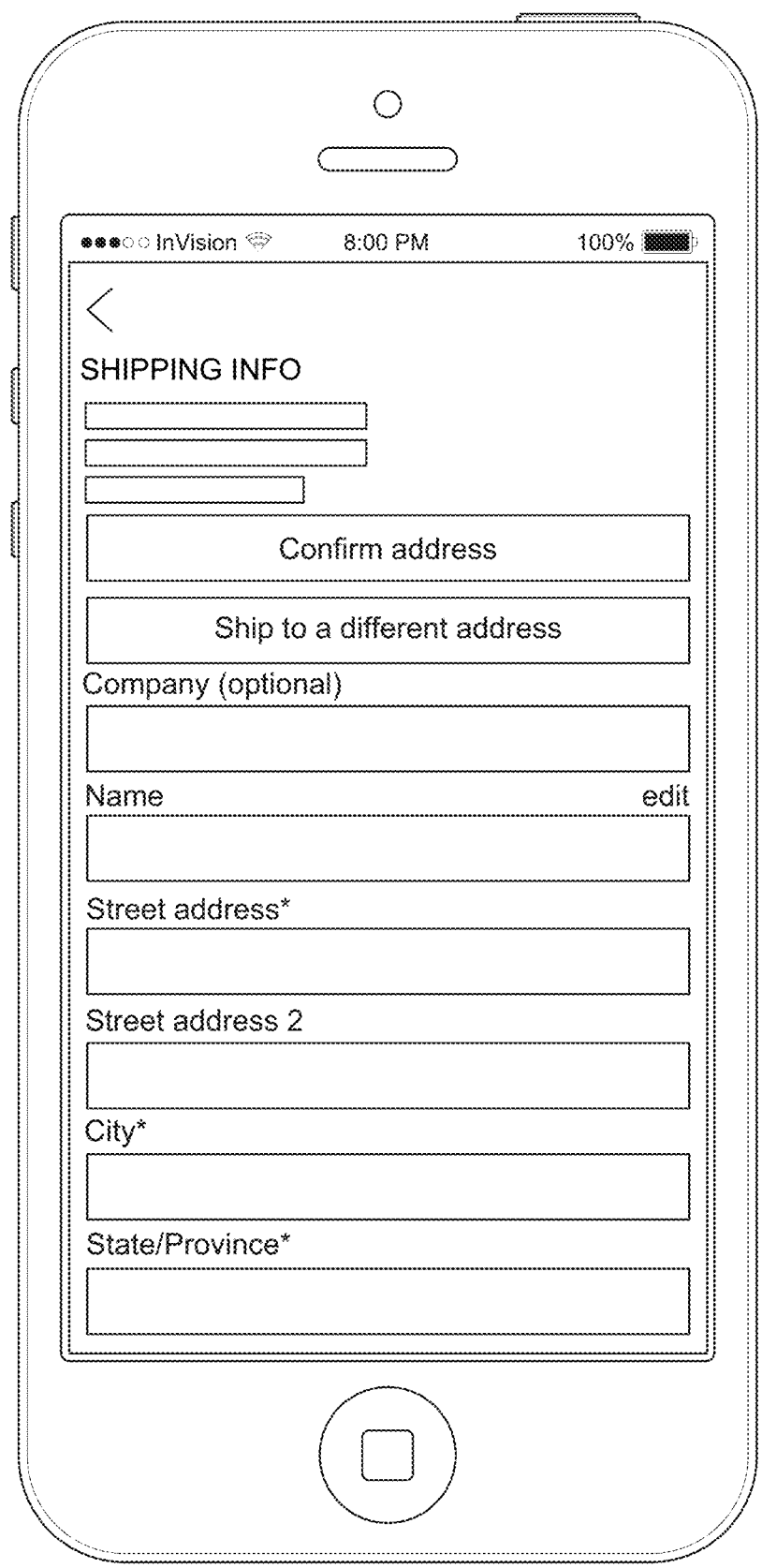
FIG. 3 is an example display screen showing an example of the bartering program's profile creation functionality.

In step 202, bartering program 106 captures the item image. Before an image can be captured by bartering program 106, a user of a first computing device creates an account and associated account profile to be stored on the service server. To create an account, a user inputs personal information such as their name, email address, phone number, and their address. FIG. 3 is an example display screen showing an example of the bartering program's profile creation functionality. In this figure, a user would input their address they wish to have goods shipped to after successful completion of a barter transaction. Additionally, a user can upload an image of themself onto their profile so other users can see what they look like and to help personalize their account profiles.

Users may authorize social network access whereby when a social network service is linked, access may be granted to various accounts of a user and importing of data from those accounts may occur such as to import one or more social network activity.

Figure 4:
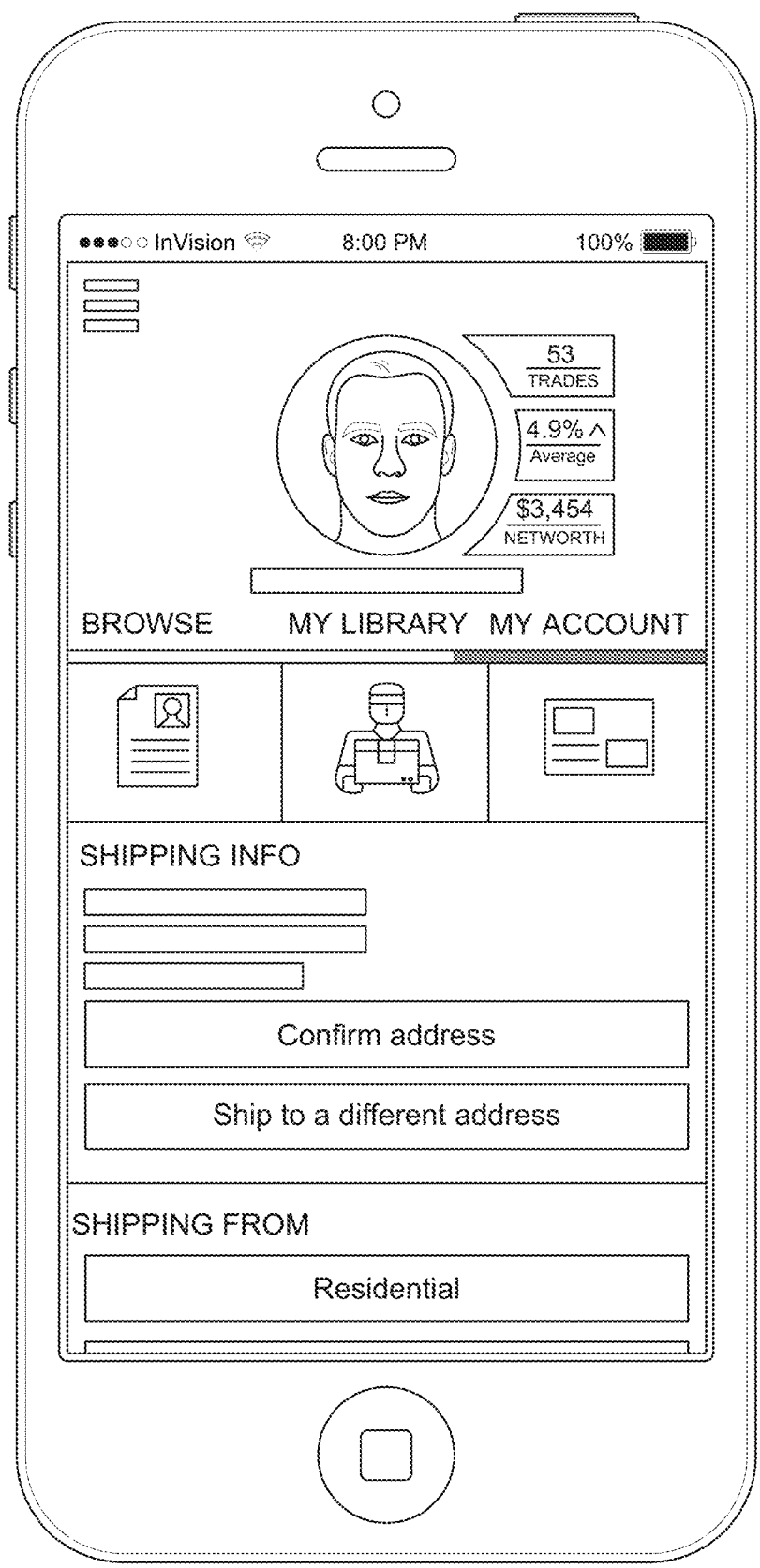
FIG. 4 is an example display screen showing an example of the bartering program's home screen.

After a user creates a profile, accessing bartering program 106 on their mobile device will bring them to a home screen. FIG. 4 is an example display screen showing an example of bartering program's 106 home screen. From the home screen, a user can access their account information, their library of items they are willing to barter, browse tradeable items, see trade data, access consumer habits and trends data, and other administrative account tasks.

The bartering program 106 captures the image of an item that the user wishes to barter by using a camera on the first computing device 110. In another embodiment, the user can upload an image of the item into the program. In a further embodiment, the user can capture or upload multiple images of the item.

In step 204 of the bartering program 106, after the image of the item has been captured, or uploaded, the program displays on the first computing device 110 a selectable input graphical user interface, the interface including one or more condition input screens for the item information. The item information can include a description of the item, the number of the items that are available to trade, the condition of the item, the item make, the item model, the item year of manufacture, or other item information.

In step 206, after the user captures or uploads the item image and inputs the item information, the program receives at the service server 104 the item image and item information transmitted from the first computing device 110. Once received, the item information and images are stored on the service server in the library of items associated with the user's account profile.

In step 208, the bartering program 106 transmits a list of tradeable items to the first computing device 110. The list of tradeable items is a list of items submitted, using the process outlined above, by other users of the program they wish to barter. The user can browse through the list of items until they find an item they wish to submit a barter offer for.

Figure 5:
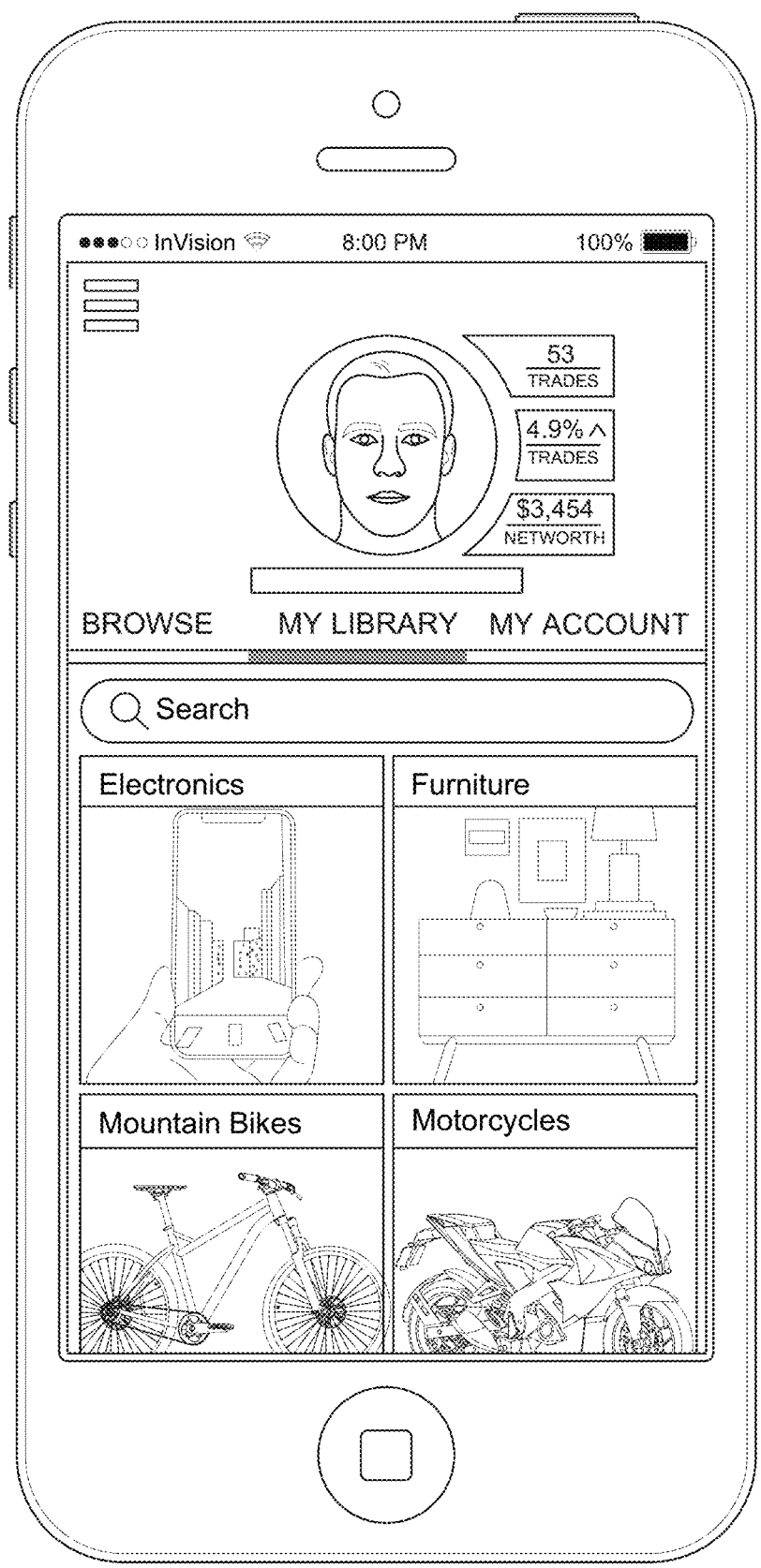
FIG. 5 is an example display screen showing an example of the bartering program's category search ability.

In one or more embodiments, a user can search the list of tradeable items by category. FIG. 5 is an example display screen showing an example of the bartering program's category search ability. By searching by category, a user can click on a category of the type of items they are interested in looking for. In one or more embodiments, as shown in FIG. 5, a search bar is displayed, allowing the user to input the name, or a description, of the item they are looking for.

In a further embodiment, a user can search for items by geographic location. In this embodiment, a user can input how large of a distance from their GPS location they are interested in seeing items from. This would allow users to search for items that would be easily accessible to them geographically. In a further embodiment, a user can set the distance away from their location that they would like to see items from. This distance can be set in miles or any other unit of measurement.

Figure 6:
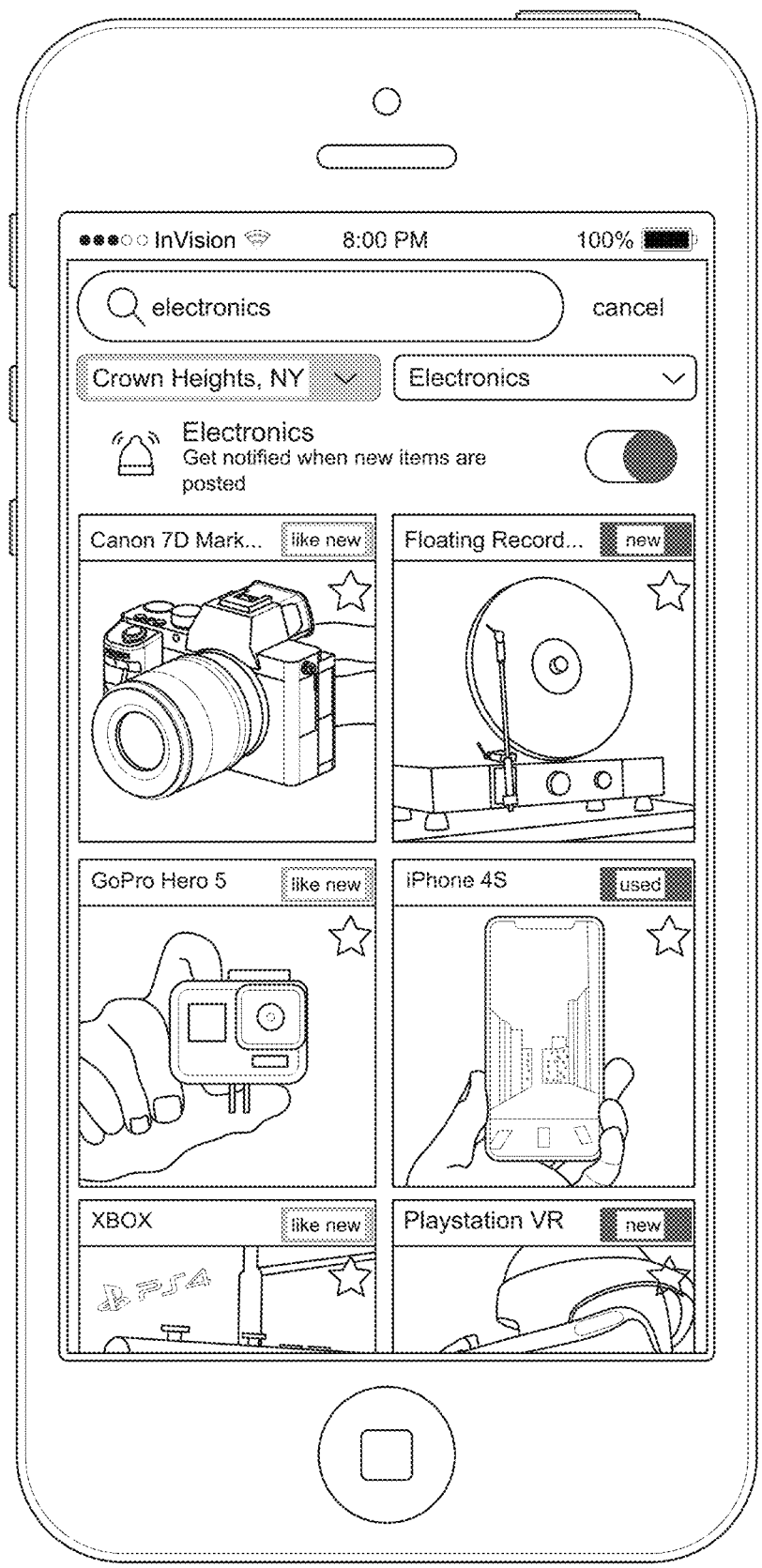
FIG. 6 is an example display screen showing an example of the bartering program's tradeable item list functionality.

In step 210, after searching for items by location, searching for the item directly or category, the bartering program 106 displays a list of tradeable items to the user on the first computing device 110. FIG. 6 is an example display screen showing an example of the bartering program's 106 tradeable item list functionality. In one or more embodiments, after displaying the list of items, the list will continuously populate with new items as the user scrolls down through the list.

When a user searches through the tradeable items list, they can select an item they are interested in bartering for. When selecting the tradeable item, a profile page for that item may be presented showing the item information. In one or more embodiments, a user can favorite the item they are looking at in order to easily access the item again at a later time wherein all favorited items can be accessed in a centralized location on the program.

In step 212, after selecting a tradeable item, the bartering program 106 displays on the first computing device 110 a selectable input graphical user interface, the interface including one or more condition input screen for barter conditions. In one or more embodiments, the barter conditions selectable on the condition input screens can include selecting one or more items from the user's library they wish to offer to barter for the selected tradeable item, the amount of tradeable items they wish to receive in the barter transaction, the desired shipping level, the market habits and trends information, or other barter conditions.

In one or more embodiments, the barter offer is the barter conditions selected on the condition input screen by the user. Once these conditions are selected, the user can submit the barter offer.

In one or more embodiments, the shipping level is the shipping speed and carrier that a user wants to receive a tradeable item they barter for. This can include air, ground, USPS, UPS, FedEx, or any shipping commonly used in packages. In a further embodiment, the user selects the shipping level, any desired shipping insurance, and pays for that shipping and insurance for the tradeable items they will be receiving. In this embodiment, it allows for users to receive the desired shipping level and insurance that they want, where if the other barterer that owned the tradeable item before the barter transaction were to ship, they would be incentivized to select the cheapest, and often the slowest, shipping level available. In a further embodiment, the shipping level can be selected during the bartering conditions or after the barter offer has been accepted. In an additional embodiment, the bartering program 106 is capable of connecting to third party shipping delivery agents or carrier databases in order to determine shipping cost, tracking the items after they are shipped, and determining completion of delivery.

Figure 7:
FIG. 7 is an example display screen showing an example of the bartering program's barter submission functionality.

In step 214, after the barter offer is submitted, the barter program 106 transmits from the first computing device 110 to the service server 104 to the second computing device 112 the barter offer. FIG. 7 illustrates an example display screen showing an example of the bartering program's barter submission functionality. As shown in this figure, the user can select an option to submit the barter offer to be sent to another user, the owner of the selected one or more tradeable items.

After the barter offer is submitted and transmitted to the second computing device 112, the user of the second computing device 112 can submit a barter response to the barter offer. In one or more embodiments, the barter response can include this user accepts the barter offer, declines the barter offer, or modifies the barter offer. If this user selects to modify the barter offer, a condition input screen for barter conditions is displayed to this user on the second computing device, allowing this user to change the barter conditions. This can include selecting different, or the quantity of, tradable items from their library, or the items from the user of the first computing device 110 library.

In step 216, the bartering program 106 receives on the first computing device 110 the barter response to the barter offer. If the user modified the original barter offer, in some embodiments, the user of the first computing device 110 can accept or further modify the barter conditions and transmit the modified barter offer back to the user of the second computing device 112.

If the barter offer was accepted, the barter transaction is completed and the users of the first and the second computing devices 110, 112 must perform their contractual duties per the barter conditions and accepted barter offer. This can include shipping their respected bartered items, using the shipping level and insurance selected by each respected user, and leaving feedback to rate the users after the transaction.

Figure 8:
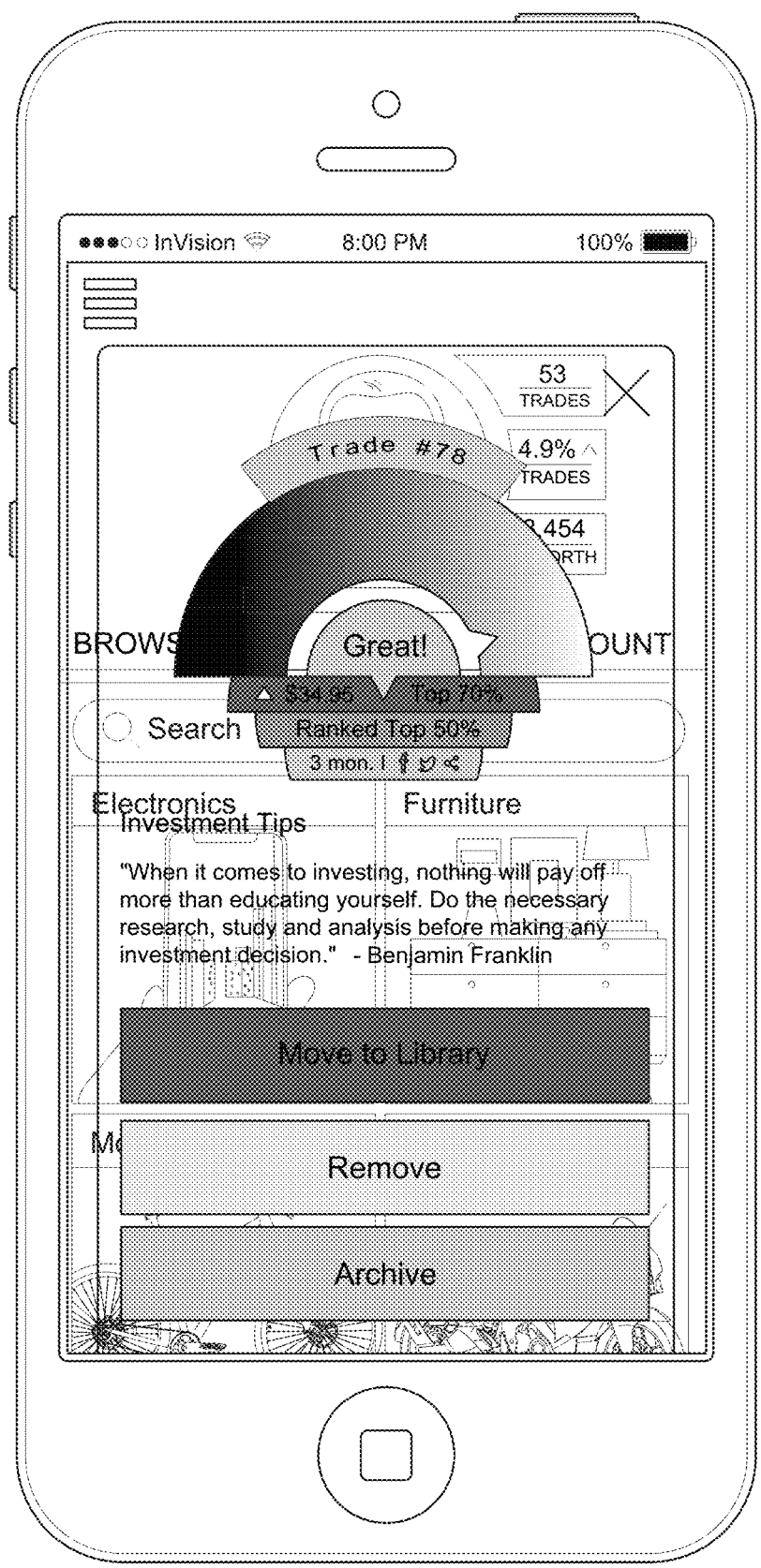
FIG. 8 is an example display screen showing an example of the bartering program's post barter transaction functionality.

FIG. 8 is an example display screen showing an example of the bartering program's post barter transaction functionality. This figure shows an example screen that can be displayed on a user's computing device allowing them to remove the bartered item from their library, or if they have multiple of the bartered items remaining, move the item back into their library, or archive the item for future displaying in their library.

In one or more non-limiting embodiments, the delivery agent may be selected based on a bidding process. A delivery agent may refer to an individual and/or a plurality of agents working together. For example, delivery agents may be allowed to bid for providing delivery services (e.g., individual services in response to orders, future looking orders based on slices of time and/or locations, and so on). A preliminary process may determine if a delivery agent meets one or more characteristics such as location, price, size, etc. before acting on the received information to initiate a possible bid. An agent may determine a bid to be placed regarding the delivery of the order including a price for making the delivery and an estimated time frame for making the delivery. Timeframe may be based on availability of a delivery agent and/or the distance to travel for shipping the item. Winning delivery agents may be selected to fill the desired number of deliveries and presented to users through computing device 110 and 112.

In one or more embodiments, barer program 106 may charge a fee to the delivery agents for referrals of bartering transactions and the shipping of bartered items, the users not affected by the referral fees. Such a fee may include a flat dollar amount, a percentage, a fee based on a service level, a fee based on a number of bartered items that have referred to the delivery agents. For example, in some embodiments, a delivery agent may pay a base fee for a high level of service that includes an unlimited number of bartered items free of charge after the base fee is paid. In some embodiments, a delivery may pay no base fee, but may be charged a percentage per bartered items referred through bartering program 106. In some embodiments, a merchant may pay, for example, about 5% of the shipping associated with bartered items.

Bartering program 106 may present the location of the bartered item to be received and the delivery agent delivering the bartered item to be received. The presentation may be in the form of a pop up window displayed to the user. Users may also be presented with a geo-spatial environment having a virtual map of the geographical location in which the delivery agent and traded item is located The virtual map may have geography and topography, which parallels the geography and topography of the physical real world. For instance a range of longitudinal and latitudinal coordinates defining a geographic area or space in the real world may be mapped to a corresponding range of longitudinal and latitudinal coordinates defining a virtual space on the virtual map as well as each individual coordinate in the range. The graphical map may be displayed with the delivery agent and/or the bartered item to be received as markers, pins, or identifiers at their respective locations.

The bartered item to be received and the delivery agent's position on the virtual map corresponds to their position the real world. Bartering program 106 may analyze the bartered item to be received and the delivery agent's position as they navigate the range of geographic coordinates in the real world such as when they are moving to their destination.

In step 218, the barter program 106 records the barter transaction on a distributed computer network 114. In one or more embodiments, the distributed computer network 114 is a network system in which all barter transactions using the barter program 106 and associated data are spread out across more than one computer. In a further embodiment, the distributed computer network is a public distributed ledger, such as a blockchain, where all barter transactions are recorded. The barter program 106 catalogues user and item behaviors, compiling data and providing it for users in order to increase efficiency in their desired areas of operation.

Figure 9:
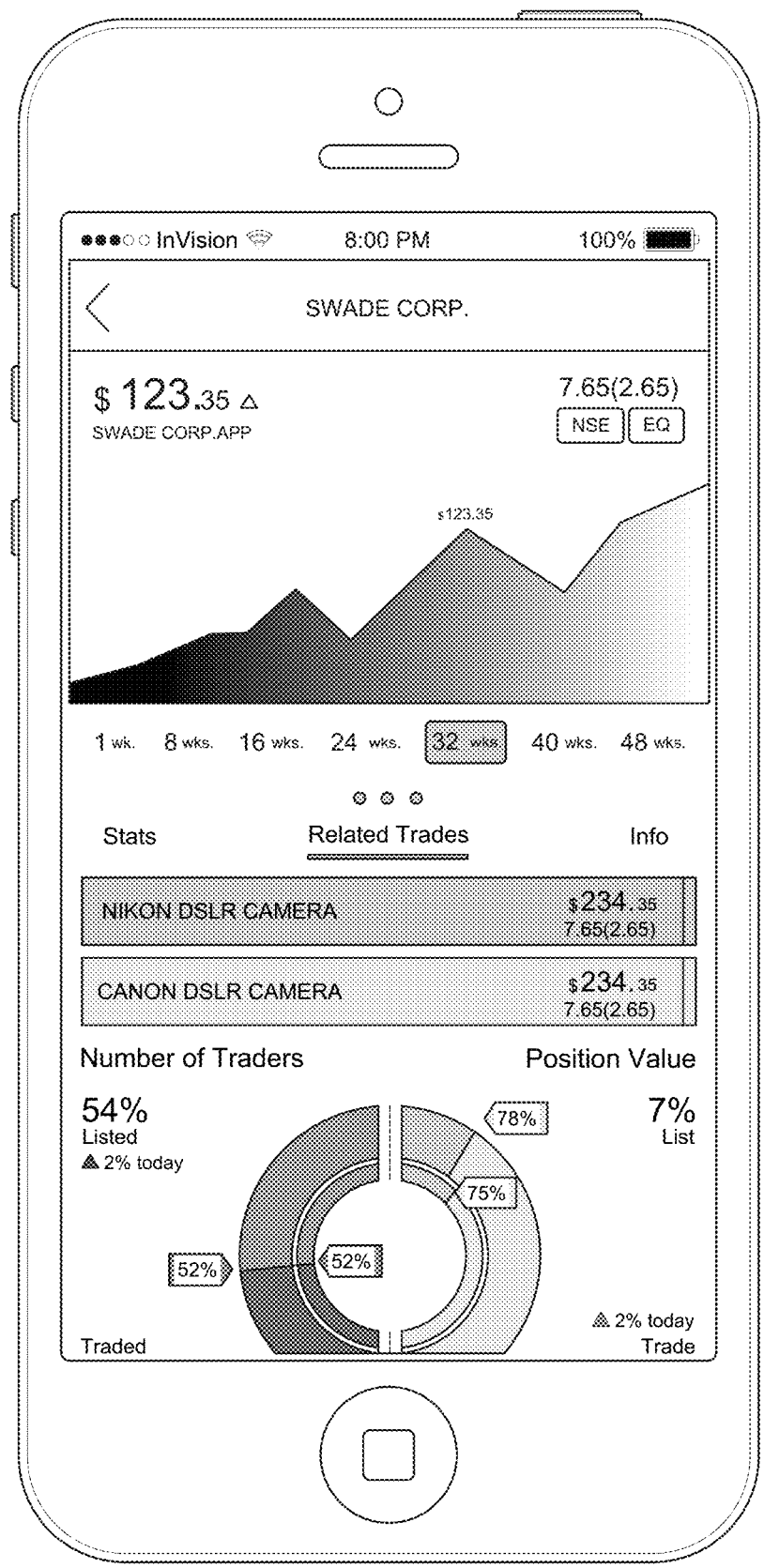
FIG. 9 is an example display screen showing an example of the bartering program's barter transaction and consumer habits and trends history functionality.
Figure 10:
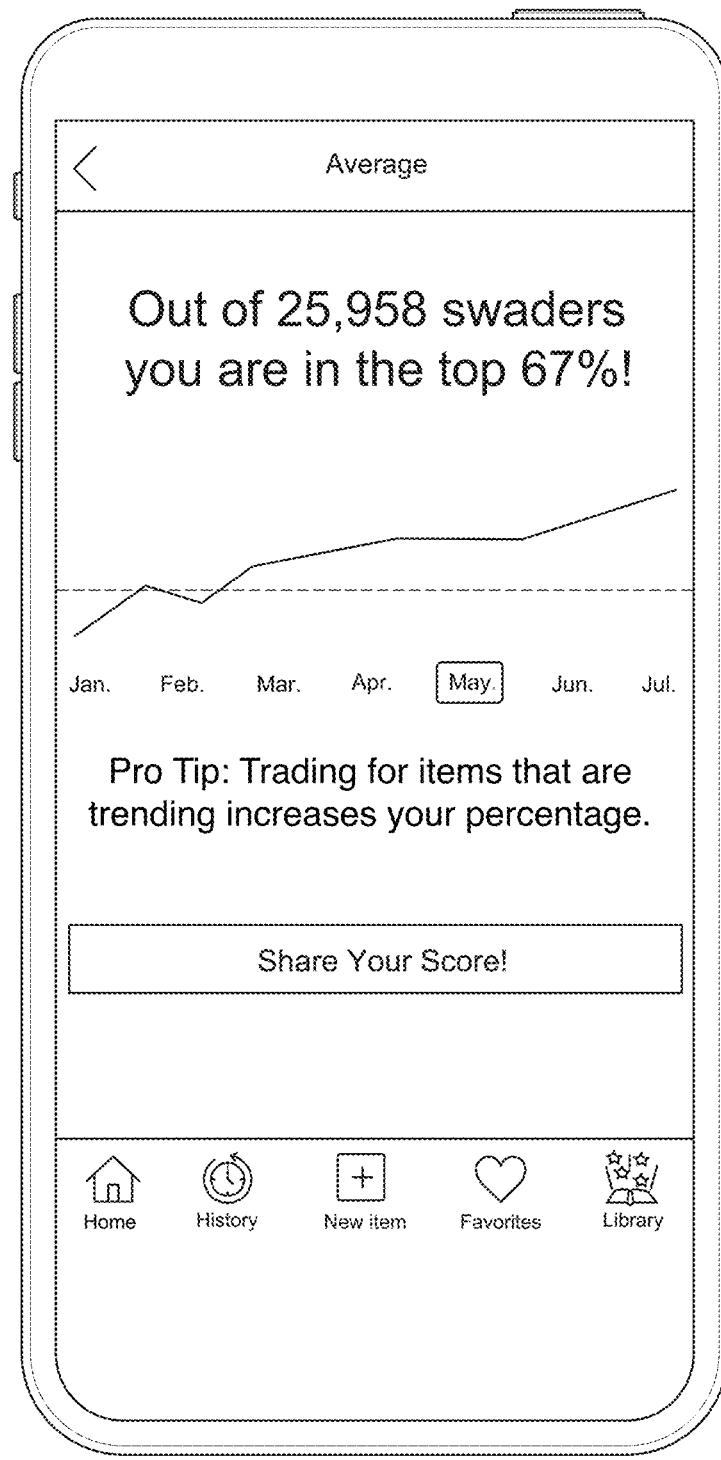
FIG. 10 is an example display screen showing an example of the bartering program's average trade history of a user.

FIGS. 9 and 10 illustrate how bartering program 106 may analyze all recorded barter transaction data on distributed computer network 114 to analyze consumer habits and trends, how well users did during the bartering transaction, and how well the users did during their transactions in comparison to other users who have exchanged same or similar tradeable items. In one or more embodiments, the program utilizes artificial intelligence and machine learning to ascertain consumer habits and trends, such as what items are more valuable during certain seasons and what is the net value or average value of an item. A performance score for a particular barter transaction may be generated by calculating the difference of a market value of the received bartered item during the bartering transaction from the market value of the exchanged bartered item. Scores may also be generated corresponding to the difference in barter score, the barter score showing the actual value of the tradeable item being exchanged by the market value of the tradeable items the item is being exchanged for, or a combination of both values.

In one or more embodiments, to determine the market value of a tradeable or bartered item, bartering program 106 may take the average value the tradeable item sells for online at traditional retail websites or online marketplaces whereby the value is stored in database 108. The market value may then be compared that to the barter value of the tradeable items the item has been traded for. For example, if a camera has an average online retail price of $200, and that camera has been trading for an average of ten phones that average $100 for the ten phones at online retail, the program can calculate the market value of both the camera and the phone to display as barter values to the user before making a barter offer. In this example the market value of the camera is $200, as collected from online marketplaces, while the barter value is $100 because that is the value the phone has been trading at, as collected from online marketplaces, or the market value of the camera is $100 but the barter value is $200 because that is the value the phone has been trading at. Program 106 gives users the ability to trade their items like a stock for higher or lower valued items based off personal needs and/or market trends. Program 106 many compute many of these calculations for all barter transaction of a user involving the item in question to determine the average barter value of the item. In a further embodiment, these calculations are calculated by utilizing artificial intelligence.

After the barter transaction is completed and recorded, a score of the barter transaction in comparison to the barter transaction of other users having a barter transaction having a same or similar tradeable item may be generated. The score may be a reflection of how well the user bartered for their tradeable item in comparison to the market value prices of the tradeable items being exchanged for. For example, when a tradeable item is exchanged by a user for a first tradeable item of a higher market value, the user may be given a higher score than when a tradeable item is exchanged by the user for a second tradeable item of a lower market value lower than the first tradeable item. Utilizing the score, the barter transaction may be ranked, the ranking corresponding to percentile of the score of the barter transaction in comparison to all of the scores of the multiple barter transactions of the same or similar tradeable items. A history of the ranking of the user may be displayed as illustrated in FIG. 10.

Figure 11:
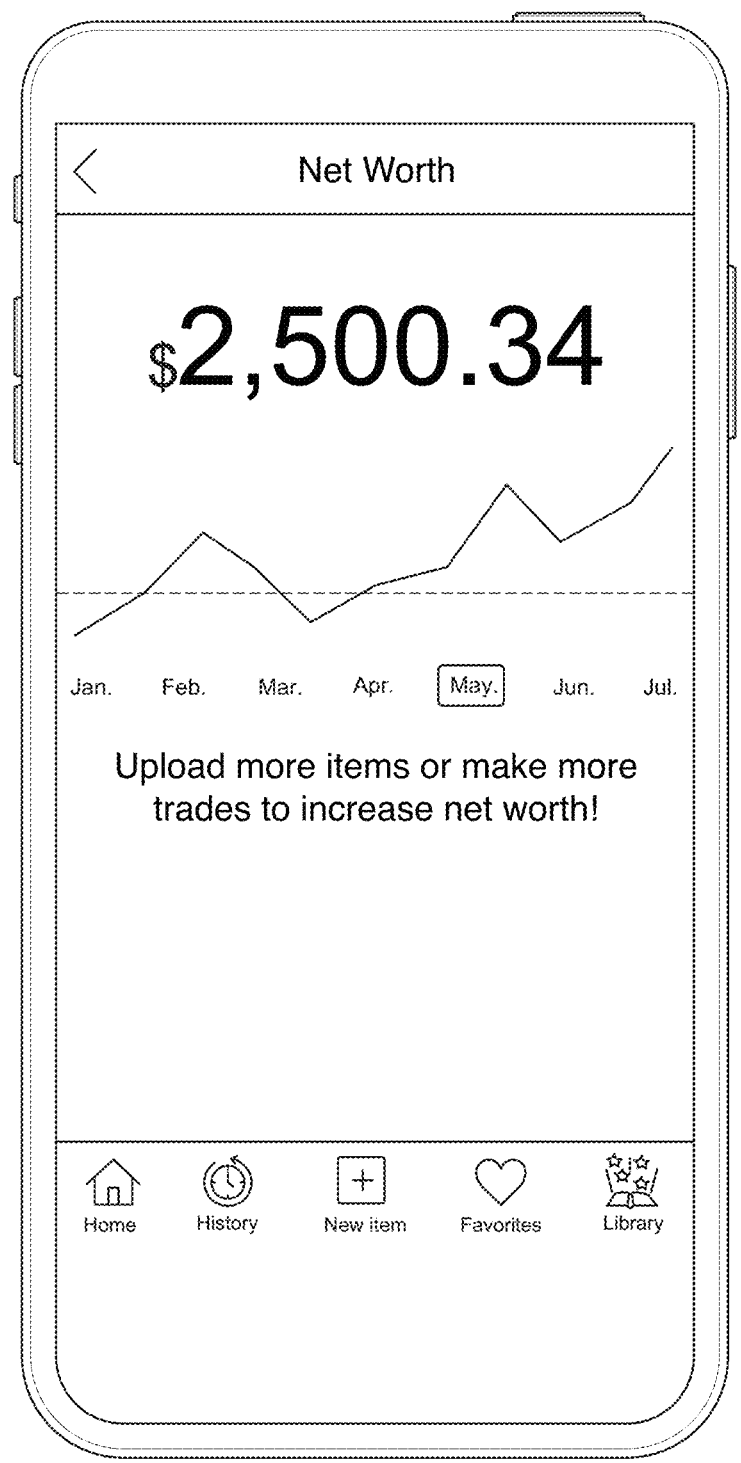
FIG. 11 is an example display screen showing an example of the bartering program's net worth of a user.

FIG. 9 is an example display screen showing an example of the bartering program's barter transaction and consumer habits and trends history functionality. As shown in this figure, the bartering program 106 can analyze the recorded barter transaction data on the distributed computer network 114 to display consumer habits and trends, such as the market value or barter value an item has traded for over a time period as well as the market value and the barter value of an entire library of the user's tradeable items. A sum of the market value and the barter value of all the tradeable items in the user's library at the present time is then calculated and compared to the net worth at previous times as illustrated in FIG. 11. The net worth or current value of the tradeable items in the library of the user, the history of the net worth, and the change in net worth over a predetermined amount of time may also be compared to other users whereby a ranking or percentile is displayed to user.

In one or more embodiments, the present electronic bartering system and method is an intertwined, connected, and online database in the form of a webpage and mobile application where people can create profiles, learn about net value (solid-state-value) management, learn how to use the platform, upload items using the in app camera and manually enter or scan data into an item's description. The system and method also allows a user to offer, store, and accept other items from other users in addition to providing the user the details regarding the items, such as market habits, while simultaneously providing suggestions on how to improve trading skills depending on the needs/wants of the user/profile.

Figure 12:
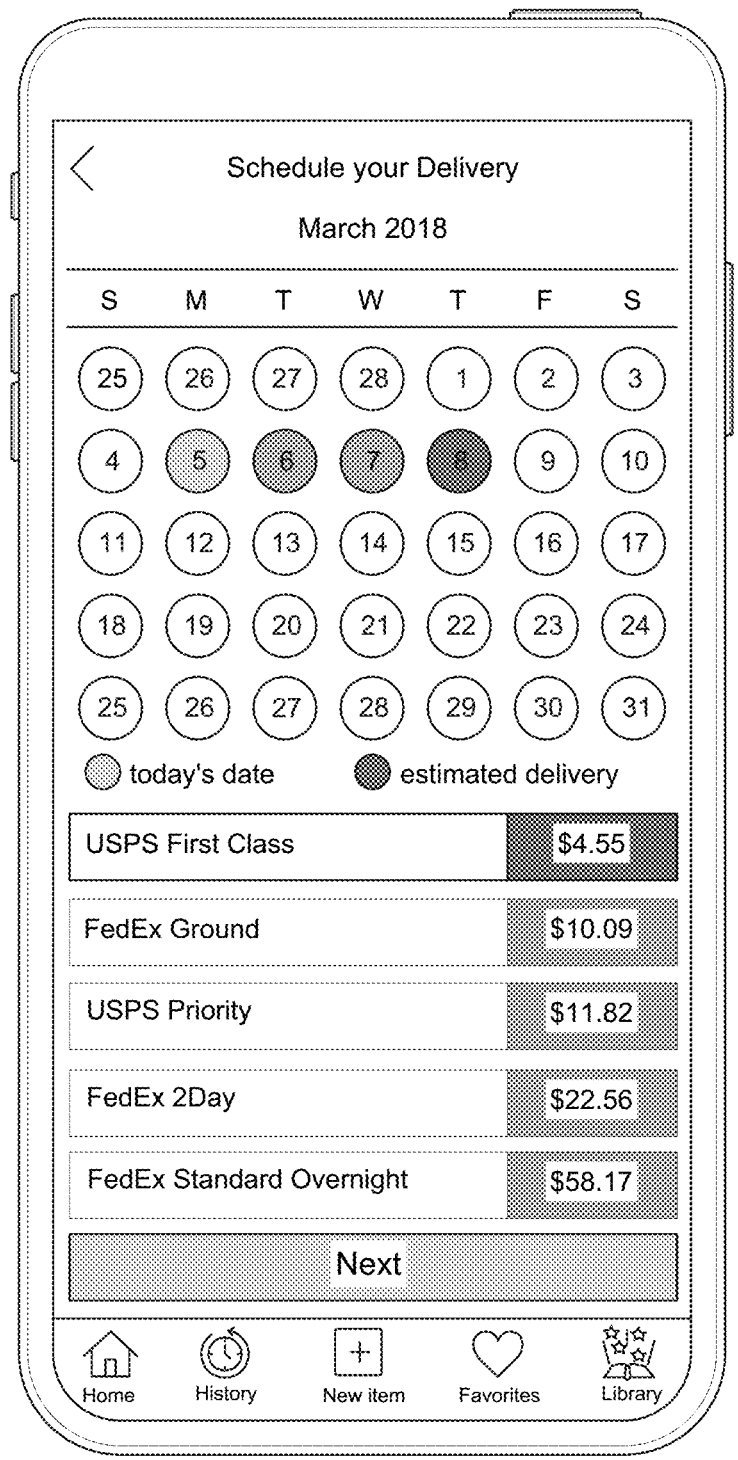
FIG. 12 is an example display screen showing an example of the bartering program's delivery scheduling system.

The users will also be able to schedule delivery/pick-ups of items as illustrated in FIG. 12, customize the format and theme of their profile, and be automatically shown data and personal/profiles information. Data showing the previous transactions for an item are available to users through blockchain processes. In some embodiments, users will be able to suggest trades to other users for a fee in addition to creating contingency trades where many trades can happen at once given a certain criterion. The system and method will house address and payment information, as well as offer integration to shipping companies' shipment processes.

Bartering program 106 may have a goal achievement system. The goal achievement system may include performance goals provided by the user where the user may set a desired performance goal which is then recorded in database 108. The performance goal may correspond to a performance score the user wishes to achieve, such as for an overall positive accrual in worth in tradeable items over a set time frame chosen by the user (such as a day, month, year) or amount of trades (such as 20, 50, 100 trades), the overall positive accrual calculated by the change or difference in market value from one of the user's tradeable items being bartered for other tradeable items received after the bartering transaction. The summary of all the changes or difference in market value may then be calculated and compared to the goal set by the user to see if the goal is reached by the user, the comparison then presented to the user.

The performance goal may also correspond to a performance score the user wishes to achieve for an average positive accrual in worth for each barter transaction, the overall positive accrual calculated by the change or difference in market value from one of the user's tradeable items being bartered for other tradeable items received after the bartering transaction. The average of all the changes or differences in market value is then calculated and compared to the goal set by the user, the comparison then presented to the user. When the user selects a goal, bartering program 106 may continue to generate a customized plan for the user to assist the user to complete this goal whereby bartering program 106 may present helpful suggestions to the user based on their bartering transactions.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or additional freely propagating electromagnetic waves, electromagnetic waves propagating through a waveguide or additional transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network, and/or a wireless network. The network may include copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In additional embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, special purpose computer, or additional programmable data processing apparatus to produce a machine, such that the instructions, which execute via the processor of the computer or additional programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or additional devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, additional programmable data processing apparatus, or additional device to cause a series of operational steps to be performed on the computer, additional programmable apparatus or additional device to produce a computer implemented process, such that the instructions which execute on the computer, additional programmable apparatus, or additional device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or table of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. An electronic bartering system comprising:
a computing system having a non-transitory computer-readable medium comprising code, the computing system having one or more processors coupled to one or more databases over a network, the one or more processors implementing steps of:
receiving a first image of a first item from a first user on a first computing device, wherein the first image is stored in the one or more databases and associated with image information data and profile data of the first user;
classifying the first image and the image information data to a first tradeable item wherein the first tradeable item is presented on a second computing device as available for a bartering transaction;
receiving a second image of a second item from a second user on the second computing device, wherein the second image is stored in the one or more databases and associated with image information data and profile data of the second user;
classifying the second image and the image information data to a second tradeable item wherein the second tradeable item is presented on the second computing device as available for the bartering transaction;
displaying on the first computing device a selectable input graphical user interface, the selectable input graphical user interface having the images of the one or more tradeable items available for the bartering transaction;
transmitting results of only a subset of the one or more tradeable items in response to a location of the first computing device;
receiving from the first computing device, request data for a request to receive the second tradeable item in exchange for the first tradeable item and storing the request data in the one or more databases;
transmitting the request to the second computing device as an offer for the bartering transaction;
receiving from the second computing device, acceptance data for the request to receive the first tradeable item in exchange for the second tradeable item and storing the acceptance data in the one or more databases;
recording the bartering transaction for the exchange of the first tradeable item and the second tradeable item;
updating an association of the profile data in the one or more databases associated with the first image and image information from the first user to the second user;
updating an association of the profile data in the one or more databases associated with the second image and the image information from the second user to the first user;
utilizing artificial intelligence and machine learning to ascertain consumer habits and trends from the bartering transaction; and
generating a virtual map with one or more indicators with the first image of the first tradeable item displayed as an indicator corresponding to a location of the first tradeable item.

2. The electronic bartering system of claim 1, the one or more processors further implementing the steps of:
determining a performance score for the first user based on a plurality of similarity scores.

3. The electronic bartering system of claim 2, the one or more processors further implementing the steps of:

determining trend data from a set of barter data for a set of historical item listings and the another set of barter data, the trend data being indicative of tradeable items that are more valuable over a predetermined period of time.

4. The electronic bartering system of claim 2, the one or more processors further implementing the steps of:
generating a customized plan for the first user from the performance score for the first user and one or more settings of the profile data of the first user.

5. The electronic bartering system of claim 4, the one or more processors further implementing the steps of:
receiving a goal, the goal selected by the first user for a desired performance barter score, the desired performance barter score calculated from a sum or average of one or more bartering transactions for tradeable items associated with the profile data of the first user over a predetermined time period.

6. The electronic bartering system of claim 1, the one or more processors further implementing the steps of:
utilizes artificial intelligence and machine learning to generate a performance score and barter score for a particular bartering transaction.

7. The electronic bartering system of claim 1, the one or more processors further implementing the steps of:
creating one or more contingency bartering transactions where a plurality of bartering transactions occur simultaneously given a certain criterion.

8. The electronic bartering system of claim 1, the one or more processors further implementing the steps of:
filtering the images of tradeable items available for the bartering transaction by one or more filtering criteria; and
determining a similarity between the first tradeable item and a set of barter data;
generating a similarity score based on one or more similarities.

9. The electronic bartering system of claim 8, wherein the one or more filtering criteria is comprised of at least one of geographic location or type of the second tradeable item.

10. The electronic bartering system of claim 9, the one or more processors further implementing the steps of:
displaying a performance score of the bartering transaction and one or more ranking indicators, the one or more ranking indicators displayed based on a percentile of the performance score of the bartering transaction in comparison to the performance score of multiple bartering transactions.

11. The electronic bartering system of claim 1, the one or more processors further implementing the steps of:
populating the selectable input graphical user interface with new items available for trade as a list is scrolled down.

12. The electronic bartering system of claim 1, the one or more processors further implementing the steps of:
recording the bartering transaction on a blockchain wherein the data for the bartering transaction for an item are available to one or more users.

13. The electronic bartering system of claim 1, the one or more processors further implementing the steps of:
presenting shipping options through the selectable input graphical user interface on the first computing device, the shipping options including a shipping service and a shipping insurance for receiving the second tradeable item;
performing a financial transaction for the shipping options selected between the first user receiving the second tradeable item and a delivery agent; and
subtracting, a value from the financial transaction for a referral fee.

14. The electronic bartering system of claim 13, the one or more processors further implementing the steps of:
initiating a bidding process to determine which one of a plurality of bidding eligible delivery agents will deliver the second tradeable item to the first user; and
connecting the first user to one of the plurality of eligible delivery agents based on an outcome of the bidding process.

15. The electronic bartering system of claim 14, the one or more processors further implementing the steps of:
displaying a location of the second tradeable item being delivered to the first user by the one of the plurality of eligible delivery agents overlaid on a virtual map corresponding to their real world location along with the one or more interactive markers.

16. A computer implemented method for implementing an electronic bartering system, the computer implemented method comprising steps executed by one or more processors:
receiving a first image of a first item from a first user, wherein the first image is stored in one or more databases and associated with image information data and profile data of the first user, the first image stored by one or more computing devices that include one or more programs containing instructions associated with the electronic bartering system;
classifying the first image and the image information data to a first tradeable item wherein the first tradeable item is presented to a second user as available for a bartering transaction;
receiving a second image of a second item from the second user, wherein the second image is stored in the one or more databases and associated with image information data and profile data of the second user; the second image stored by the one or more computing devices;
classifying the second image and the image information data to a second tradeable item wherein the second tradeable item is presented as available for the bartering transaction;
displaying a selectable input graphical user interface, the selectable input graphical user interface having images of tradeable items available for the bartering transaction wherein the images of tradeable items available are filterable by user or tradeable item;
transmitting results of only a subset of the one or more tradeable items in response to a location of the first computing device;
receiving request data for a request to receive the second tradeable item in exchange for the first tradeable item and storing the request data in the one or more databases;
transmitting the request to the second user as an offer for the bartering transaction;
receiving acceptance data for the request to receive the first tradeable item in exchange for the second tradeable item and storing the acceptance data in the one or more databases;
recording the bartering transaction for the exchange of the first tradeable item and the second tradeable item;

updating an association of the profile data in the one or more databases associated with the first image and image information from the first user to the second user;

updating an association of the profile data in the one or more databases associated with the second image and image information from the second user to the first user;

generating a first price and a second price for the first tradeable item based on a set of historical item listings and a set of barter data for the set of historical item listings and another set of barter data;

utilizing artificial intelligence and machine learning to ascertain consumer habits and trends from the bartering transaction; and generating a virtual map with one or more indicators with the first image of the first tradeable item displayed as an indicator corresponding to a location of the first tradeable item.

17. The computer implemented method of claim 16 further comprising:

collecting real time market value data for determining a market value for the first tradeable item and the second tradeable item, the real time market value data collected from one or more online marketplaces;

storing the real time market value data collected from the one or more online marketplaces in the one or more databases;

determining the market value of the first tradeable item by retrieving a current price of the first tradeable item from the one or more online marketplaces;

determining the market value of the second tradeable item by retrieving the current price of the second tradeable item from the one or more online marketplaces;

determining a barter value for the first tradeable item by a combined determined market value of tradeable items that have been exchanged for the first tradeable item over a predetermined time period;

calculating a barter score, the barter score calculated from subtracting the market value of the first tradeable item from the market value of the second tradeable item exchanged for the first tradeable item; and presenting through the user interface, the barter value, the market value, and the barter score of the first tradeable item, the barter value of the first tradeable item presented to a subset of users with profile data associated with the first tradeable item.

18. The computer implemented method of claim 17, further comprising:

calculating a total barter value of the one or more tradeable items of the first user; the total barter value calculated from a sum of the barter value of the one or more tradeable items associated with the profile data of the first user;

calculating a total market value of the one or more tradeable items of the first user; the total market value calculated from a sum of the market value of the one or more tradeable items associated with the profile data of the first user; and presenting through the user interface, the total barter value and the total market value of the one or more tradeable items associated with the profile data of the first user.

19. An electronic bartering system comprising:

a computing system having a non-transitory computer-readable medium comprising code, the computing system having one or more processors coupled to one or more databases over a network, the one or more processors implementing steps of:

receiving a first image of a first item from a first user on a first computing device, wherein the first image is stored in the one or more databases and associated with image information data and profile data of the first user;

classifying the first image and the image information data to a first tradeable item wherein the first tradeable item is presented on a second computing device as available for a bartering transaction;

receiving a second image of a second item from a second user on the second computing device, wherein the second image is stored in the one or more databases and associated with image information data and profile data of the second user;

classifying the second image and the image information data to a second tradeable item wherein the second tradeable item is presented on the second computing device as available for the bartering transaction;

transmitting images of tradeable items available for the bartering transaction to the first computing device;

displaying on the first computing device a selectable input graphical user interface, the selectable input graphical user interface having the images of the one or more tradeable items available for the bartering transaction;

transmitting results of only a subset of the one or more tradeable items in response to a location of the first computing device;

receiving from the first computing device, request data for a request to receive the second tradeable item in exchange for the first tradeable item and storing the request data in the one or more databases;

transmitting the request to the second computing device as an offer for a the bartering transaction;

receiving from the second computing device, acceptance data for the request to receive the first tradeable item in exchange for the second tradeable item and storing the acceptance data in the one or more databases;

recording the bartering transaction for the exchange of the first tradeable item and the second tradeable item;

updating an association of the profile data in the one or more databases associated with the first image and image information from the first user to the second user;

updating an association of the profile data in the one or more databases associated with the second image and image information from the second user to the first user;

accessing a set of historical item listings, each historical item listing of the set of historical item listings having a category, a set of historical characteristics, and a set of barter data, the set of barter data being indicative of barter values and relationships among barters placed for each historical item listing;

accessing another set of barter data between another set of prices collected for the first tradeable item;

generating a first price and a second price for the first tradeable item based on the set of historical item listings and the set of barter data for the set of historical item listings and the another set of barter data;

utilizing artificial intelligence and machine learning to ascertain consumer habits and trends from the bartering transaction; and generating a virtual map with one or more indicators with the first image of the first tradeable item displayed as an indicator corresponding to a location of the first tradeable item.

\* \* \* \* \*